United States Patent Office 3,213,907
Patented Oct. 26, 1965

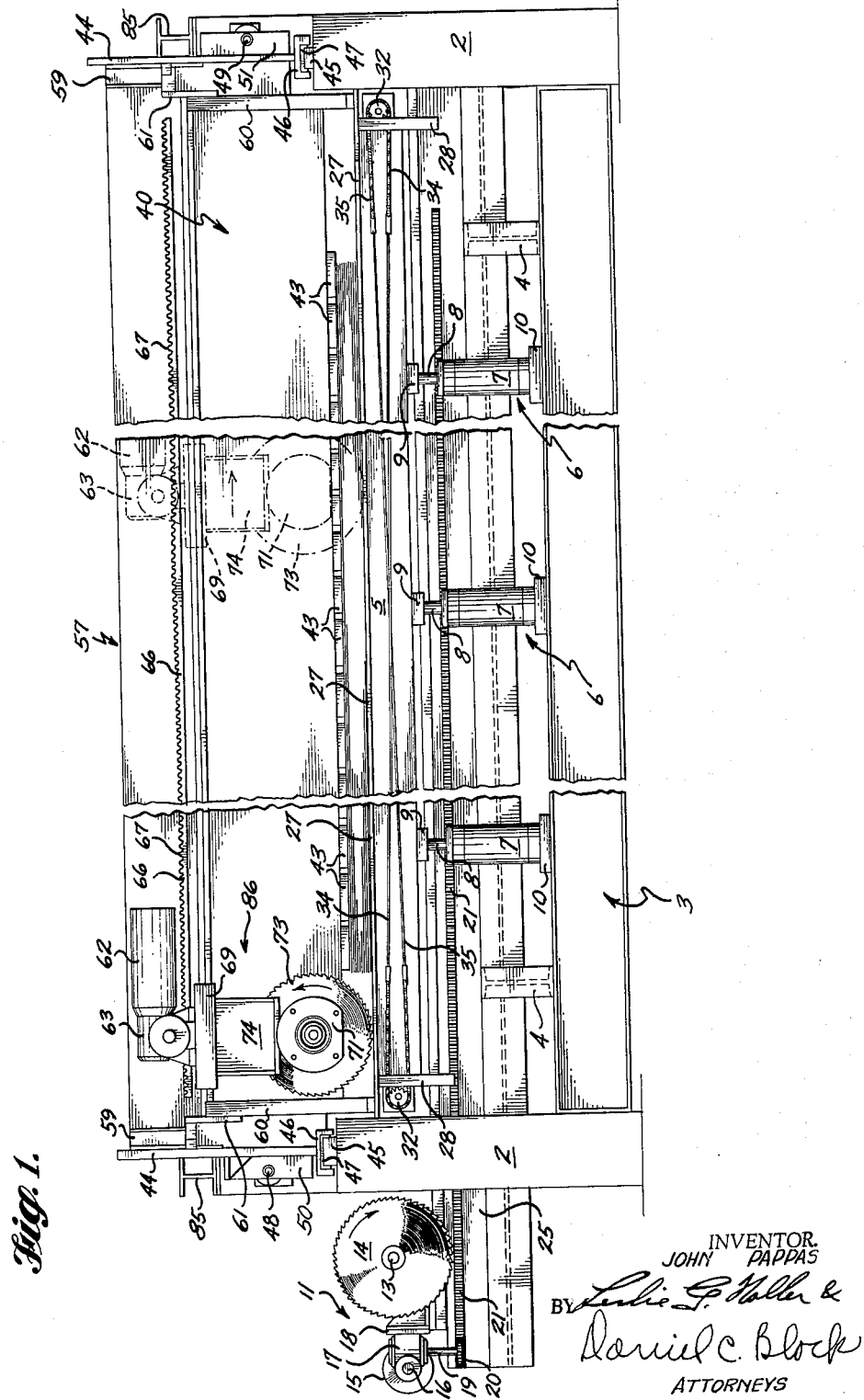

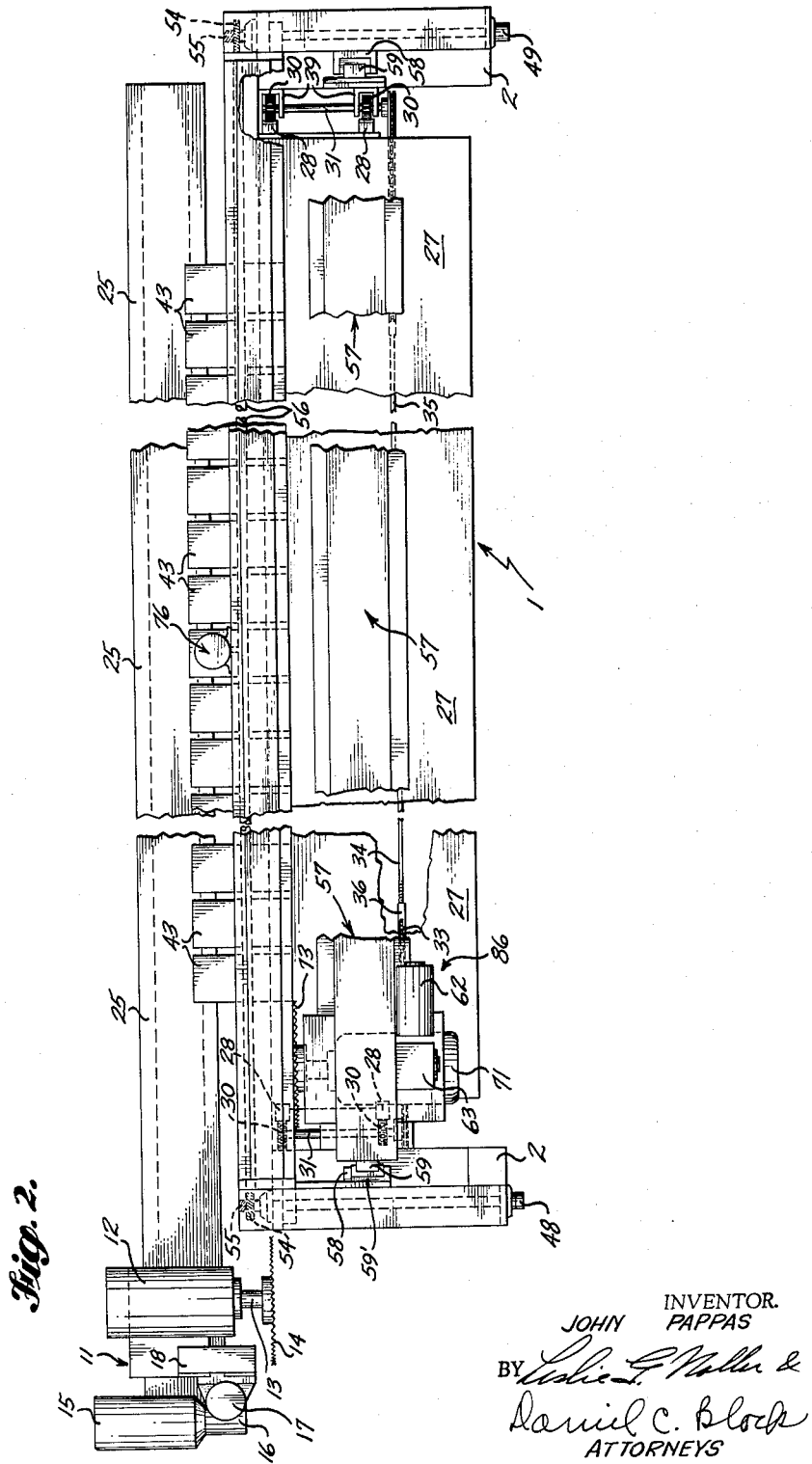

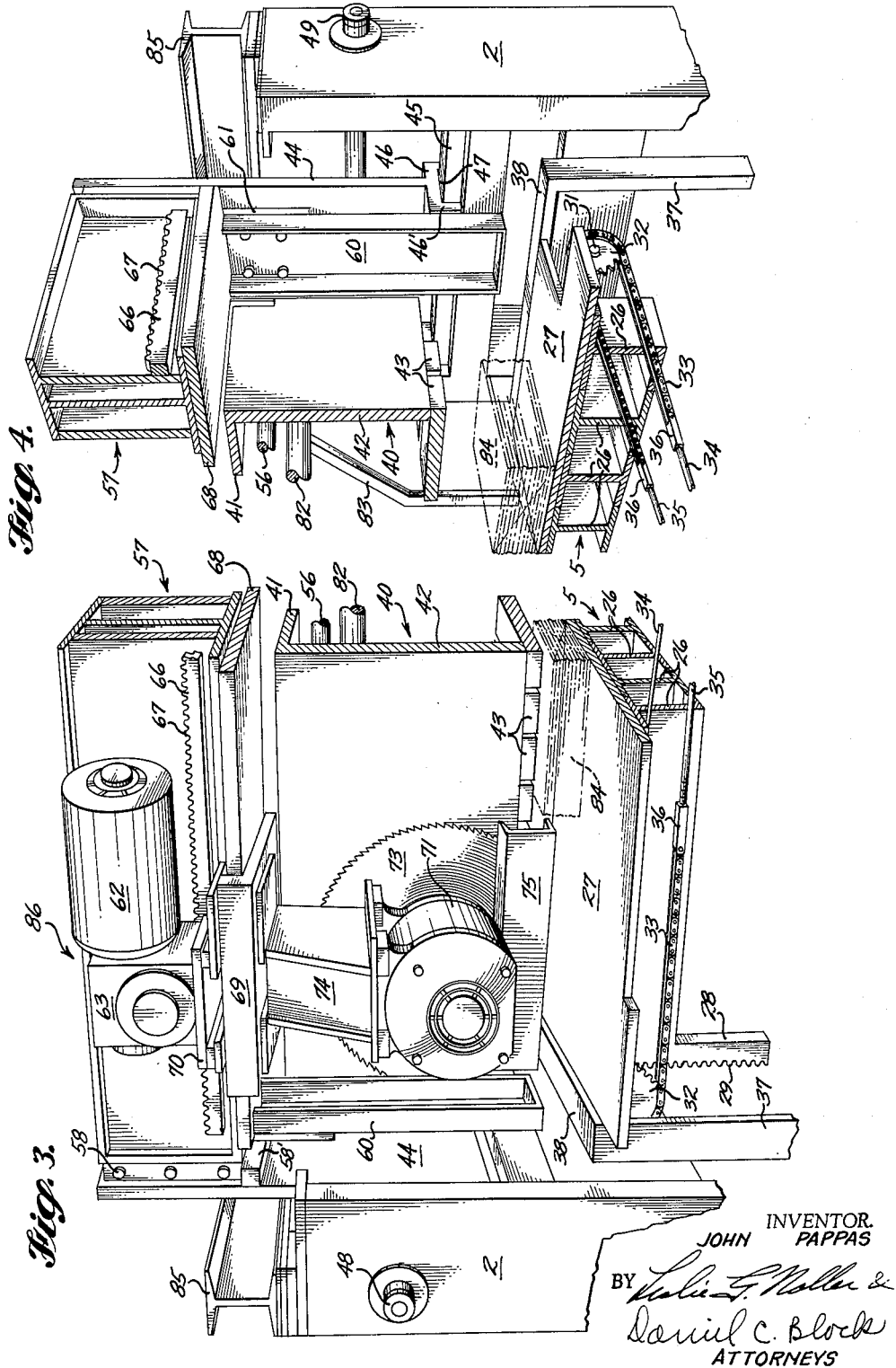

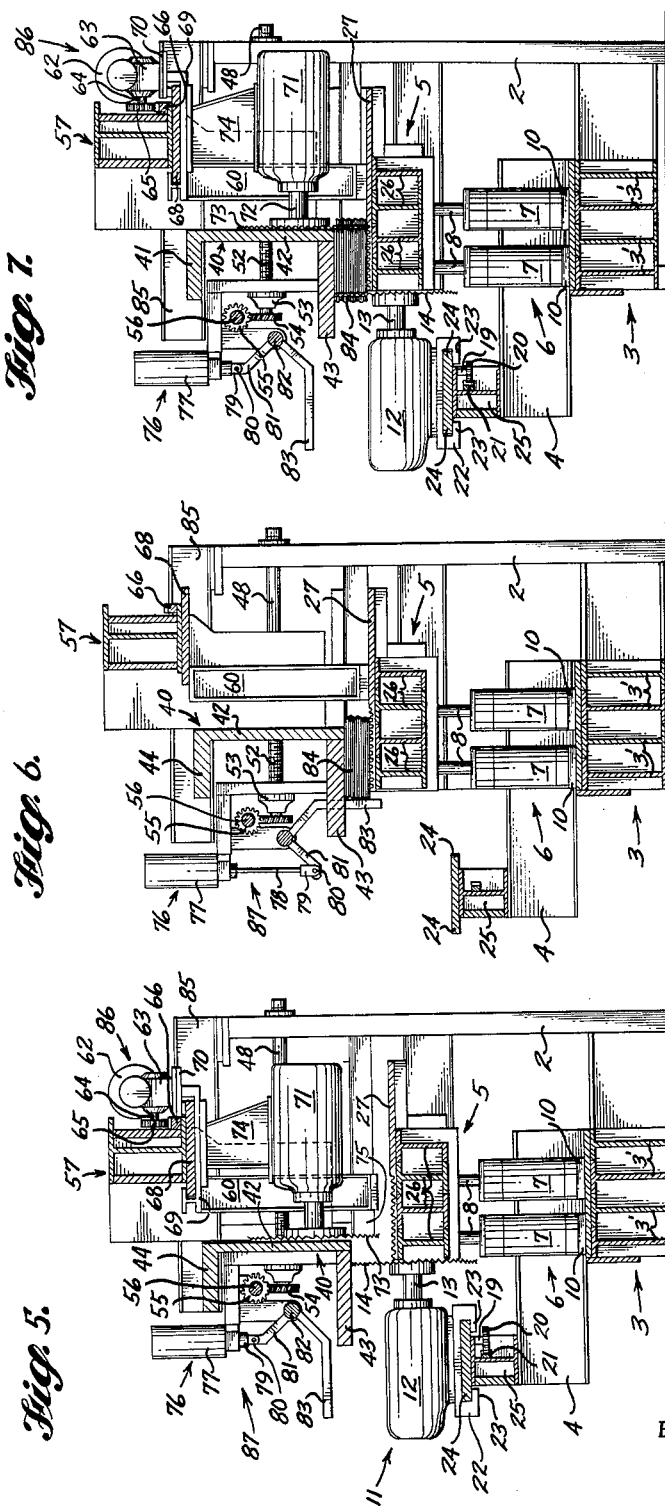

3,213,907
VENEER JOINTER MACHINE
John Pappas, Piqua, Ohio, assignor to Weyerhaeuser Company, Tacoma, Wash., a corporation of Washington
Filed Mar. 19, 1963, Ser. No. 266,369
10 Claims. (Cl. 143—47)

This invention relates to a veneer jointer that cuts both sides of a stack of veneer simultaneously to insure that the sides thereof are parallel to each other. More specifically, this invention relates to a veneer jointer for cutting both sides of a stack of veneer employing a floating saw beam which moves vertically with the saw table to keep the saw height constant above the table and also movable laterally to accommodate various widths.

Heretofore, veneer stacks have been jointed by a traveling head machine or a guillotine-type machine that is capable of cutting only one side of the veneer stack at a time. This requires that the operator first clamp the bundle in the machine, then cut one side thereof. Then the operator must unclamp the bundle or stack of veneer, turn the bundle over and try to line up the smooth edge with a scribe line or the like, reclamp and cut the other side. This allows the veneer to move from internal stress changes when it is unclamped and before the other side is jointed parallel. Also, when veneer is jointed in stacks, the friction between the individual sheets often prevents perfect alignment of the jointed side, thus making some pieces that are not parallel with the side cut. Moreover, differences in human error in placing the cut side with the scribe line or against stops causes the sides to be unparallel. This problem of forming the sides of the veneer in a non-parallel manner, is especially important in hardboard veneer because of the high value of the veneer and because such veneer is used for decorative panels where appearance is a prime consideration.

An object of this invention is to provide a veneer jointer which forms the sides of a stack of veneer in a parallel manner.

Another object of this invention is to provide a veneer jointer machine which reduces the handling of the veneer stacks by cutting both sides of the stack at the same time without additional handling.

An object of this invention is to provide a veneer jointer machine which is capable of being adjusted to cut veneer stacks in various widths.

These and other objects and advantages will become manifestly clear to those skilled in the art when taken in conjunction with the following detailed description and drawings, wherein:

FIGURE 1 is a side elevation of the veneer jointer machine.

FIGURE 2 is a top plan view of the veneer jointer machine with parts omitted to show internal details.

FIGURE 3 is a cross-sectional view of one end of the veneer jointer machine shown in perspective to show internal details.

FIGURE 4 is a cross-sectional view of another end of the machine similar to FIGURE 3 showing internal details.

FIGURE 5 is a cross-sectional view of the end of the machine shown in FIGURE 3 in one operative position.

FIGURE 6 is another cross-sectional view similar to FIGURE 5 with parts omitted showing the machine in another operative position.

FIGURE 7 is a cross-sectional view of the veneer machine similar to FIGURE 5 showing the parts in another operative position.

Referring to the drawings, the veneer jointer machine is generally indicated at 1 and is supported by spaced vertical support beams indicated at 2 and an elongated horizontal support member indicated at 3. Actually the support member 3 is comprised of a plurality of I-beams 3′ connected together to form a unitary support member as seen more clearly in FIGURE 5. The upper ends of the vertical support members 2 are connected by cross beams 85 to present a generally rectangular configuration.

Mounted on top of the support member 3 is a plurality of hydraulic motor means 6 which include a cylinder member 7 having a piston therein, not shown, with a piston rod 8 extending out the upper end of the cylinder 7. The cylinders 7 are supported by a support member 10 connected to the lower end with the upper end of the piston rod 8 being provided with an enlargement 9 which engages the underside of the saw table 5. The hydraulic motor means 6 are generally comprised of a plurality of cylinders 7 and are spaced underneath the table 5 so that the table 5 can be raised or lowered in a uniform manner.

As seen more clearly in FIGURES 1 and 5, the lower saw support member 4 extends transversely of the support member 3 and supports a slide rail 25 that mounts a lower saw assembly 11.

The lower saw assembly 11 generally comprises a motor 12 having a shaft 13 extending therefrom which is connected to a saw blade 14. The motor 12 is adapted to be connected to a reduction gear 17 through the mechanism of connecting plates 18. The reduction gear 17 is adapted to be driven by a motor 15 having a shaft 16 extending therefrom and connected to the gear 17. Extending from one end of the gear 17 is a shaft 19 which is connected to a pinion gear wheel 20. The wheel 20 is adapted to co-operate with a track 21 mounted in the side of the slide 25 having teeth, not shown, whereby the lower motor assembly 11 can be moved along the slide rail 25 upon actuation of the motor 15 which turns the gear 17 which will turn the wheel 20 to move the motor assembly 11 back and forth along the slide 25.

As seen more clearly in FIGURE 5, the lower saw assembly 11 is mounted on a motor mount 22 having inwardly extending flanges 23 that co-operate with a plate member 24 that will prevent the motor 12 from being moved vertically off of the track 25.

The saw table 5 is actually comprised of a plurality of I-beams 26 secured together to form a flat table-like structure. Mounted on top of the I-beams 26 is a table plate 27 that is adapted to receive a stack of veneer indicated at 84.

At each end of the table member 5 are mounted at least two vertical bars 28 having teeth 29 thereon. The vertical bars 28 with the teeth 29 thereon are adapted to co-operate with gear wheels 30 having teeth thereon that mesh with the teeth 29 which functions to stabilize the table on its up and down travel. The gear wheels 30 are connected by shaft 31 which extends from one side of the machine 1 to the other and has a sprocket wheel 32 mounted thereon. The sprocket wheels 32 are adapted to receive a chain 33 therearound which chain 33 is connected to rods 34 and 35 by connectors or splicers 36. It should be noted that the rods 34 and 35 cross at the intermediate section of the machine as indicated in FIGURE 1. In this manner the sprocket wheels 32 will turn in opposite directions upon movement of the table up or down. This will insure that the table is parallel at all times upon movement thereof.

The shaft 31 and gear wheels 30 are mounted on support posts 37 having a crossarm 38 connecting the upper ends thereof. Extending from the crossarm 38 is a supporting yoke 39 for shaft 31.

A stationary beam structure indicated at 40 is mounted directly above the table at each end of the machine 1. The stationary beam member 40 generally comprises an upper horizontal piece 41 and an intermediate vertical member 42 and a plurality of horizontally positioned pressure bars 43 properly secured to the vertical member 42.

Each end of the stationary beam member 40 is secured to a support plate 44 which is supported by a guide bar 45. The guide bar 45 is supported by the vertical support beams 2. The lower end of the support plate 44 is provided with a guide track 46 that is provided with spaced projections 46′ that form a groove 47 that rides on top of the guide bar 45. In this manner the stationary member can be moved laterally along the guide bar 45.

The stationary beam member 40 is adapted to be moved laterally by a pair of shafts indicated at 48 and 49 at each end of the machine 1. The shafts 48 and 49 extend through a gear box 50 and are provided with threads 52 thereon. By rotating either shaft 48 or 49, the threads 52 co-operate with gear box 50 to move support plate 44 laterally along the track or guide bar 45. It should be noted that the gear box 50 is rigidly secured to the rear end or back side of the support plate 44. The shafts 48 and 49 extend through bearing mounts indicated at 53 which secures the shafts 48 and 49 to the support members 2.

As seen more clearly in FIGURE 5, for example, one end of the shafts 48 and 49 is provided with a gear wheel 54 having teeth thereon which co-operate with gear wheel 55 mounted on an elongated shaft 56 that extends the full length of the machine 1. It should be noted that the gear structure indicated at 54 and 55 is provided at each end of the machine 1 to insure that the ends of the stationary beam 40 move laterally in unison.

A floating beam indicated at 57 is also supported by the support plate 44. The floating beam 57 rests upon a cross support member 58′ and is provided with a vertical track indicated at 58 in FIGURES 2 and 3 that provides a groove structure indicated at 59′ which receives a vertical guide bar 59 that will allow vertical movement of the floating beam 57. At each end of the floating beam 57 is positioned a spacer bar 60 rigidly mounted to a spacer support bar 61. The spacer bar 60 is adapted to maintain a fixed distance between the table and the floating beam 57 which will be set forth hereinafter.

Mounted on the floating beam member 57 is an upper saw assembly indicated at 86. The upper saw assembly 86 is generally provided with a motor 62 that is connected to a reduction gear box 63 having a shaft 64 extending therefrom with a gear wheel 65 connected thereto.

The gear wheel 65 is adapted to co-operate with a track 66 having meshing teeth 67 thereon so that the upper saw assembly 86 can be moved along the floating beam member 57. The lower surface of the floating beam 57 is provided with a slide plate 68 which is adapted to co-operate with a slide member 69 which is connected to the reduction gear 63 by a support member indicated at 70. In this manner the reduction gear 63 will move the upper saw assembly 86 along the floating beam 57 when the motor 62 is actuated which turns the gear wheel 65 and will move the support member 70 along the track 66. A motor 71 having a shaft 72 extending therefrom and connected to a saw blade 73 is adapted to be supported by the slide 69 by a rigid support member 74. In this manner, the saw motor 71 and blade 73 will travel along with the slide 69 when the reduction gear 63 moves the gear along the floating beam 57. Rigidly connected to the lower end of the motor means 71 is a guard rail 75.

A line-up assembly 87 is provided on one side of the machine 1 in order to properly place the stack of veneer 84 onto the table 5.

The line-up assembly 87 generally comprises a hydraulic motor 76 including a cylinder 77 having a piston, not shown, therein and a piston rod 78 extending through the lower end of the cylinder 77. The outer end of the piston rod 78 has a yoke member 79 connected thereto with a connecting link 81 connected thereto by a pivot pin 80. The connecting link 81 is in turn connected to an elongated shaft 82 that extends from one end of the machine 1 to the other.

Spaced along the shaft 82 is a plurality of line-up arms 83 that are adapted to swing between the pressure bars 43 and provide a back-up or stop which will allow the veneer stack 84 to be placed onto the table 5.

In operation, it will be assumed that the table 5 of the veneer jointer assembly 1 is in its lowermost position with the lower saw assembly 11 and upper saw assembly 86 at the left side of the machine as shown in FIGURE 1.

With the table 5 at its lowermost position, the operator first determines the proper width of the veneer to be cut. The operator then adjusts the lateral dimensions of the machine assembly 1 by rotating either the shaft 48 or 49 at each end of the assembly 1 by a hand wheel, not shown. As the shaft 48 or 49 is rotated, the threads 52 on the shafts 48 or 49 co-operate with the gear box 50 to move the support plate 44 laterally along the track 45. This will move the stationary beam laterally along the machine 1.

After the operator has made the proper adjustment, the hydraulic motor means 76 on the line-up assembly 87 is actuated. This will extend the piston rod 78 from the cylinder 77. This will rotate shaft 82 by links 81 to bring the line-up arm 83 vertically along the table 5 as shown in FIGURE 6. The stack of veneer 84 to be jointed is now loaded onto the table 5 and adjacent the line-up arm 83 as shown in FIGURE 6. Thereafter, the operator then actuates the hydraulic motor 76 to withdraw the piston rod 78 and pivot the shaft 82 and remove the line-up arm 83.

The hydraulic motor means 6 is now actuated and the table 5 begins to rise. As the table 5 begins to rise, the veneer stack 84 will be pressed between the pressure bars 43 and the table 5.

As the table begins to rise, it will be maintained in a constantly level position by the action of the gear wheels 30 at each end thereof.

When the table reaches a predetermined height, it will strike the lower end of the spacer bar 60 mounted on the floating beam 57. As the table further rises, the floating beam 57 will rise therewith through the facilities of the guide mechanism indicated at 58 and 59. In this manner the proper distance between the upper saw assembly 86 and the saw table 5 is at all times maintained.

After the table 5 has been raised to compress the stack of veneer 84, the motor means 71 on the upper saw assembly 86 is actuated. Also, the motor means 12 on the lower mechanism 11 is actuated.

Then, the operator actuates the motor 62 on the upper assembly 86 and the motor 15 on the lower saw assembly 11. When the motor means 62 and 15 are actuated, the reduction gear 63 and 17 are actuated and the lower saw assembly 11 and upper saw assembly 86 are moved along the tracks 15 and 66 in a parallel manner to cut the sides of the veneer stack 84 in a parallel manner as indicated in FIGURE 7.

After the veneer stack 84 has been cut, the table 5 is lowered and the veneer stack 84 having the sides cut parallel are removed.

It should be noted that the slide plate 68 carrying the upper saw assembly 86 and the plate member 24 carrying the lower saw assembly 11 are absolutely parallel to each other which makes it possible to saw the sides of the veneer stack 84 parallel to one another.

If desired, a low pressure vacuum system can be connected to the machine to remove the sawdust from the machine as the veneer stack 84 is being cut.

While the specific details of a preferred embodiment have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A veneer jointer assembly, comprising: vertical and horizontally extending support members; a vertically movable saw table adapted to support a stack of veneer to be jointed; a stationary beam means supported above said saw table by a support plate having a guide track on its lower end which co-operates with a guide bar supported by said supporting members adapted to guide said stationary beam means laterally with respect to said supporting members; a floating beam means supported by said support plate adjacent said stationary beam means and movable vertically relative thereto; means on said floating beam engageable with said saw table to maintain a fixed distance between said floating beam and said saw table; an upper saw assembly carried by said floating beam means on one side of said saw table and movable longitudinally relative thereto; a lower saw assembly carried by said jointer assembly on the other side of said saw table and movable longitudinally relative thereto in a direction parallel with respect to said upper saw assembly.

2. A veneer jointer assembly in accordance with claim 1 wherein said support plate includes a gear structure associated with a threaded shaft member to move said support plate laterally.

3. A veneer jointer assembly in accordance with claim 2 wherein said floating beam means is fixed to said support plate by vertical track and guide bar whereby said floating beam means may move vertically with respect to said supporting plate.

4. A veneer jointer assembly, comprising: vertically and horizontally supporting members; a vertically movable saw table adapted to support a stack of veneer to be jointed; said saw table being supported by hydraulic motor means adapted to move said saw table vertically with respect to said support members; a stationary beam means supported above said saw table on a support plate having a guide track on its lower end that cooperates with a guide bar supported by said supporting members and including laterally extending pressure bars so that said stack of veneer can be clamped between said saw table and said pressure bars; a floating beam means supported by said support plate adjacent said stationary beam means and movable vertically relative thereto; means on said floating beam engageable with said saw table to maintain a fixed distance between said floating beam and said saw table; an upper saw assembly carried by said floating beam means on one side of said saw table and movable longitudinally relative thereto; a lower saw assembly carried by said jointer assembly on the other side of said table and movable longitudinally relative thereto in a direction parallel with respect to said upper saw assembly; whereby said upper and lower saw assemblies will cut the sides of said stack of veneer clamped between said saw table and said pressure bars parallel with respect to each other.

5. A veneer jointer assembly in accordance with claim 4, wherein: said saw table includes a vertical guide bar having teeth thereon at each end of said table, and a shaft having gear wheels thereon which co-operate with said teeth on said vertical bars to maintain said saw table in a horizontal position.

6. A veneer jointer assembly in accordance with claim 4 wherein said floating beam is provided with a vertical track on each end thereof which co-operates with a guide member to provide for vertical movement of said floating beam, and said means on said floating beam engageable with said saw table to maintain said fixed distance between said floating beam and said saw table is a spacer bar.

7. A veneer jointer assembly in accordance with claim 1, wherein: said upper and lower saw assemblies are each provided with a longitudinally extending track and a gear means driven by a motor to move said saw assemblies longitudinally with respect to said veneer jointer assembly.

8. A veneer jointer assembly in accordance with claim 1 together with a line-up assembly to stop the stack of veneer being placed in said jointer assembly so that it is lined up to remove sufficient trim from said stack of veneer.

9. A veneer jointer assembly in accordance with claim 8, wherein: said line-up assembly comprises a hydraulic motor means connected to a shaft member by connecting links, and line-up arms connected to said shaft and adapted to rotate with said shaft upon actuation of said hydraulic motor means to move said arm means adjacent said saw table to line up said stack of veneer therewith.

10. A veneer jointer assembly, comprising: a saw table on which a stack of veneer is adapted to be placed; hydraulic means connected to said saw table to move said saw table upward under sufficient pressure to flatten said stack of veneer; pressure bars supported by a stationary beam to resist the upward motion of said stack of veneer on said saw table; means to adjust the stationary beam laterally to accommodate varying widths of said stacks of veneer; a lower saw assembly below the table fixed laterally with respect to said table but having a longitudinal track and a means to drive said lower saw assembly along said track; an upper saw assembly on a floating beam above said table including a longitudinal track and a means to drive said upper saw assembly along said track; spacer bar means to connect the floating beam means vertically with respect to said saw table to maintain a fixed spacing between said saw table and said floating beam; and a line-up assembly to stop said stack of veneer being placed in said veneer jointer assembly so that said stack can be lined up to remove sufficient trim; whereby the sides of said stack of veneer are cut parallel with respect to each other upon actuation of said upper and lower saw assemblies.

References Cited by the Examiner

UNITED STATES PATENTS

| | | | |
|---|---|---|---|
| 516,012 | 3/94 | Hayes | 143—132.4 |
| 2,579,613 | 12/51 | Rambo et al. | 144—208.7 |
| 2,854,733 | 10/58 | Smith | 83—488 |
| 3,072,158 | 1/63 | Duarte | 143—47.8 |

FOREIGN PATENTS 569,488  5/45  Great Britain.

LESTER M. SWINGLE, *Primary Examiner.*

WILLIAM W. DYER, JR., *Examiner.*